United States Patent [19]

Tauati

[11] Patent Number: 5,364,065
[45] Date of Patent: Nov. 15, 1994

[54] PUSH CONTROL FAUCET HANDLE

[76] Inventor: Reef L. Tauati, 504 A Haihai Street, Hilo, Hi. 96720

[21] Appl. No.: 118,516

[22] Filed: Sep. 9, 1993

[51] Int. Cl.5 .................. F16K 35/02; F16K 11/20
[52] U.S. Cl. .......................................... 251/96; 4/619; 4/676; 74/553; 74/554; 137/606
[58] Field of Search ............... 4/619, 675, 676, 638, 4/677; 137/603, 606; 251/95, 96, 215, 229, 321, 322, 323; 16/121, DIG. 30; 74/553, 554

[56] References Cited

U.S. PATENT DOCUMENTS

| 628,258 | 7/1899 | West | 251/95 |
|---|---|---|---|
| 1,525,393 | 2/1925 | Jernatowski | 137/606 |
| 2,218,662 | 10/1940 | Smith | 137/606 |
| 2,234,052 | 3/1941 | Luenz | 251/95 |
| 2,829,538 | 4/1958 | Mueller | 251/96 |
| 3,193,243 | 7/1965 | Billington et al. | 251/96 |
| 3,210,040 | 10/1965 | Thurlow | 251/96 |
| 3,773,080 | 11/1973 | Raschke | 251/96 |
| 4,344,457 | 8/1982 | Caroli | 137/606 |
| 4,549,716 | 10/1985 | Warren | 251/96 |
| 4,779,305 | 10/1988 | Gorsek | 74/553 |
| 5,037,066 | 8/1991 | Kerger et al. | 251/96 |
| 5,048,365 | 9/1991 | Webb | 74/553 |
| 5,232,140 | 8/1993 | Gregory et al. | 74/554 |

Primary Examiner—George L. Walton
Attorney, Agent, or Firm—Michael I. Kroll

[57] ABSTRACT

A push control faucet handle is provided for a sink having a spout which consists of a housing mounted to the sink. A water control valve is connected to bottom of the housing. The water control valve has a first pipe line connected to a water supply and a second pipe line connected to the spout in the sink. A knob rides within the housing and is adjustably coupled to the water control valve. A device is for biasing the knob to a raised position above a top surface of the sink. The knob can be manually rotated to open and close the water control valve to control the flow of water from the water supply to the spout in the sink. A mechanism is for retaining the knob in a lowered position flush with the top surface of the sink, when the knob is pressed down into the housing and for releasing the knob so it will return to the raised position when the knob is pressed again. When the knob is in the lowered position a young child will have difficulty in reaching and operating the knob.

9 Claims, 3 Drawing Sheets

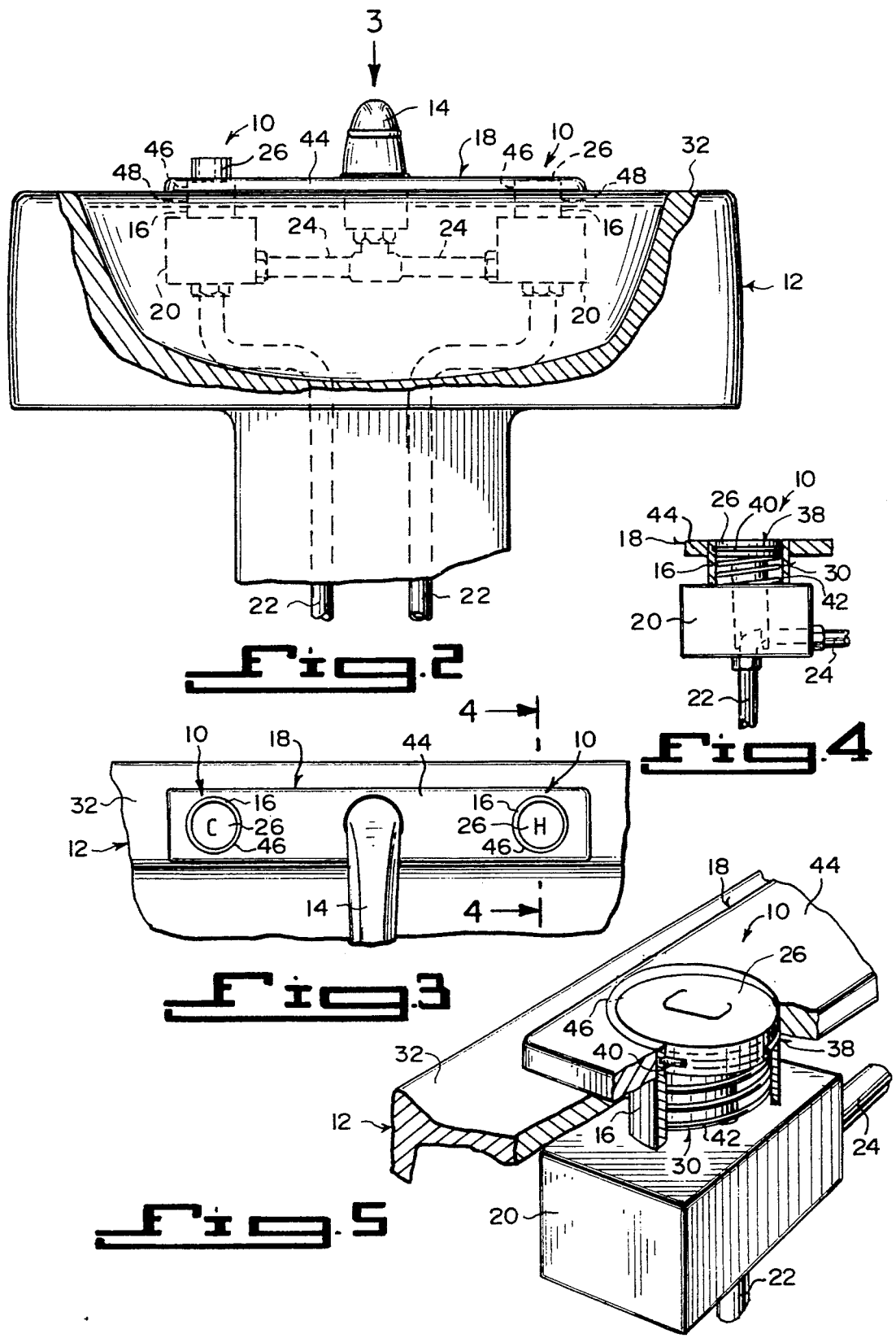

PUSH CONTROL FAUCET HANDLE

BACKGROUND OF THE INVENTION

1. Field of the Invention

The instant invention relates generally to faucets and more specifically it relates to a push control faucet handle.

2. Description of the Prior Art

Numerous faucets have been provided in prior art that are devices containing values for controlling a flow of water or other liquids from pipes, tanks, barrels, drums or other reservoirs by opening and closing. While these units may be suitable for the particular purpose to which they address, they would not be as suitable for the purposes of the present invention as heretofore described.

SUMMARY OF THE INVENTION

A primary object of the present invention is to provide a push control faucet handle that will overcome the shortcomings of the prior art devices.

Another object is to provide a push control faucet handle for a sink that can be raised and lowered by pressing down on it, so when in a lowered position it is inaccessible to children who may cause a flood or burn themselves with hot water.

An additional object is to provide a push control faucet handle for a sink that when in a raised position it can be manually operated as a standard faucet to open and close the water valve control in the sink.

A further object is to provide a push control faucet handle that is simple and easy to use.

A still further object is to provide a push control faucet handle that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 2 is a front view with parts broken away taken in direction of arrow 2 in FIG. 1.

FIG. 3 is a top view with parts broken away taken in direction of arrow 3 in FIG. 2.

FIG. 4 is a partial cross sectional view taken along line 4—4 in FIG. 3.

FIG. 5 is an enlarged perspective view with parts broken away and in section of one of the push control faucet handles in the sink.

DETAILED DESCRIPTION OF THE PREFERRED EMBODIMENTS

Figure 1:
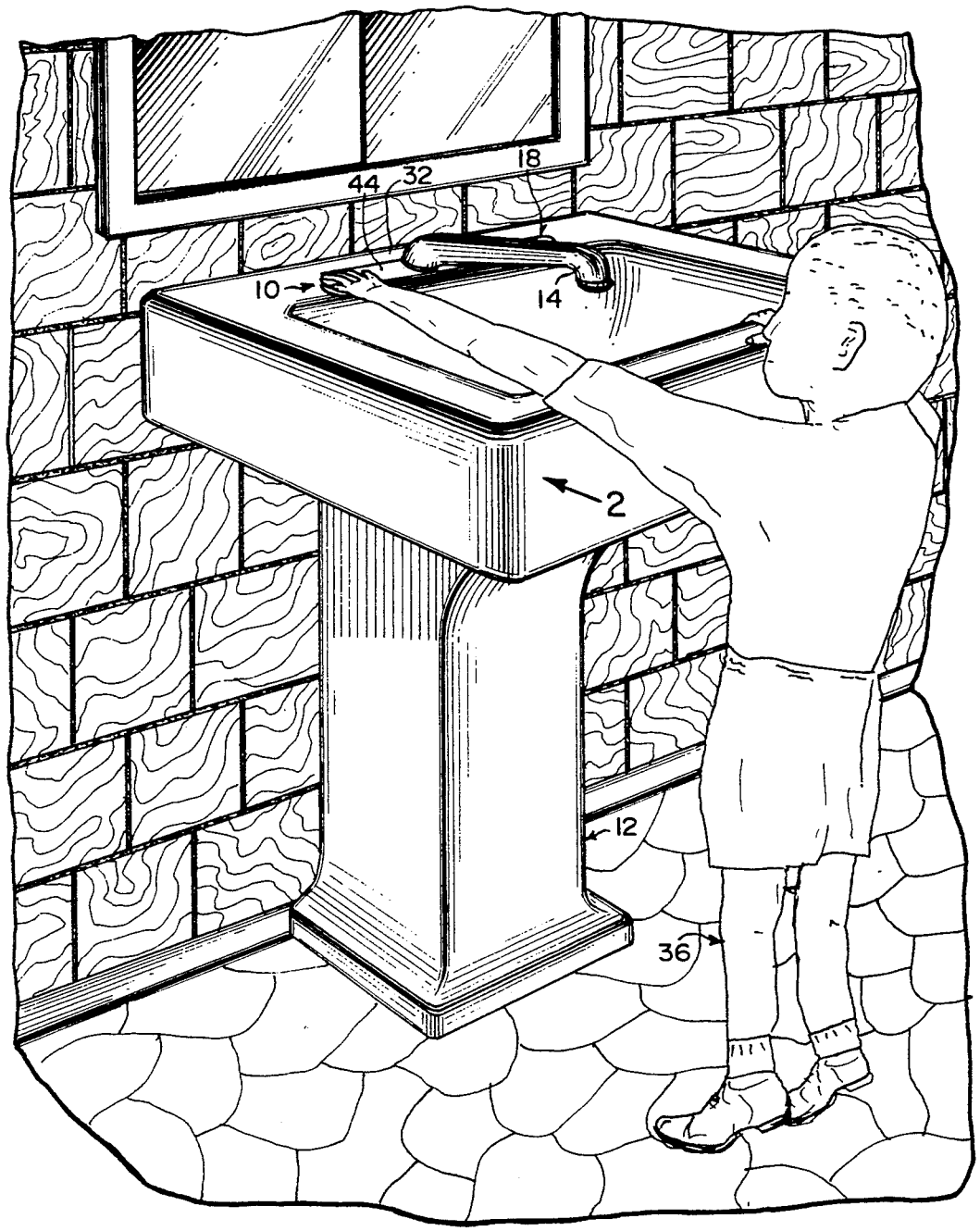
FIG. 1 is a perspective view of a sink showing a young child trying to operate one of the push control faucet handles.

Turning now descriptively to the drawings, in which similar reference characters denote similar elements throughout the several views, FIGS. 1 through 6 illustrate two push control faucet handles 10 for a sink 12, having a spout 14. Each handle 10 consists of a housing 16, with a structure 18 for mounting the housing 16 to the sink 12. A water control valve 20 is connected to the bottom of the housing 16. The water control valve 20 has a first pipe line 22 connected to a water supply and a second pipe line 24 connected to the spout 14 in the sink 12. A knob 26 rides within the housing 16. An apparatus 28 is for adjustably coupling the knob 26 to the water control valve 20. A device 30 is for biasing the knob 26 to a raised position above a top surface 32 of the sink 12. The knob 26 can be manually rotated to open and close the water control valve 20, to control the flow of water from the water supply to the spout 14 in the sink 12. A mechanism 34 is for retaining the knob 26 in a lowered position flush with the top surface 32 of the sink 12, when the knob 32 is pressed down into the housing 16 and for releasing the knob 26, so it will return to the raised position when the knob 26 is pressed again, When the knob 26 is in the lowered position, a young child 36 will have difficulty in reaching and operating the knob 26.

The push control faucet handle 10 further includes a member 38 for sealing a space between the housing 16 and the knob 26, so as to prevent water leakage into the housing 16 from the top surface 32 of the sink 12. The sealing member 38 is at least one rubber O-ring 40.

The biasing device 30 is a helical compression spring 42. The mounting structure 18, as shown in FIGS. 1 through 5, is an escutcheon plate 44, having an opening 46 therethrough in which the housing 16 is affixed therein, whereby the housing 16 will extend through an aperture 48 in the sink 12.

Figure 6:
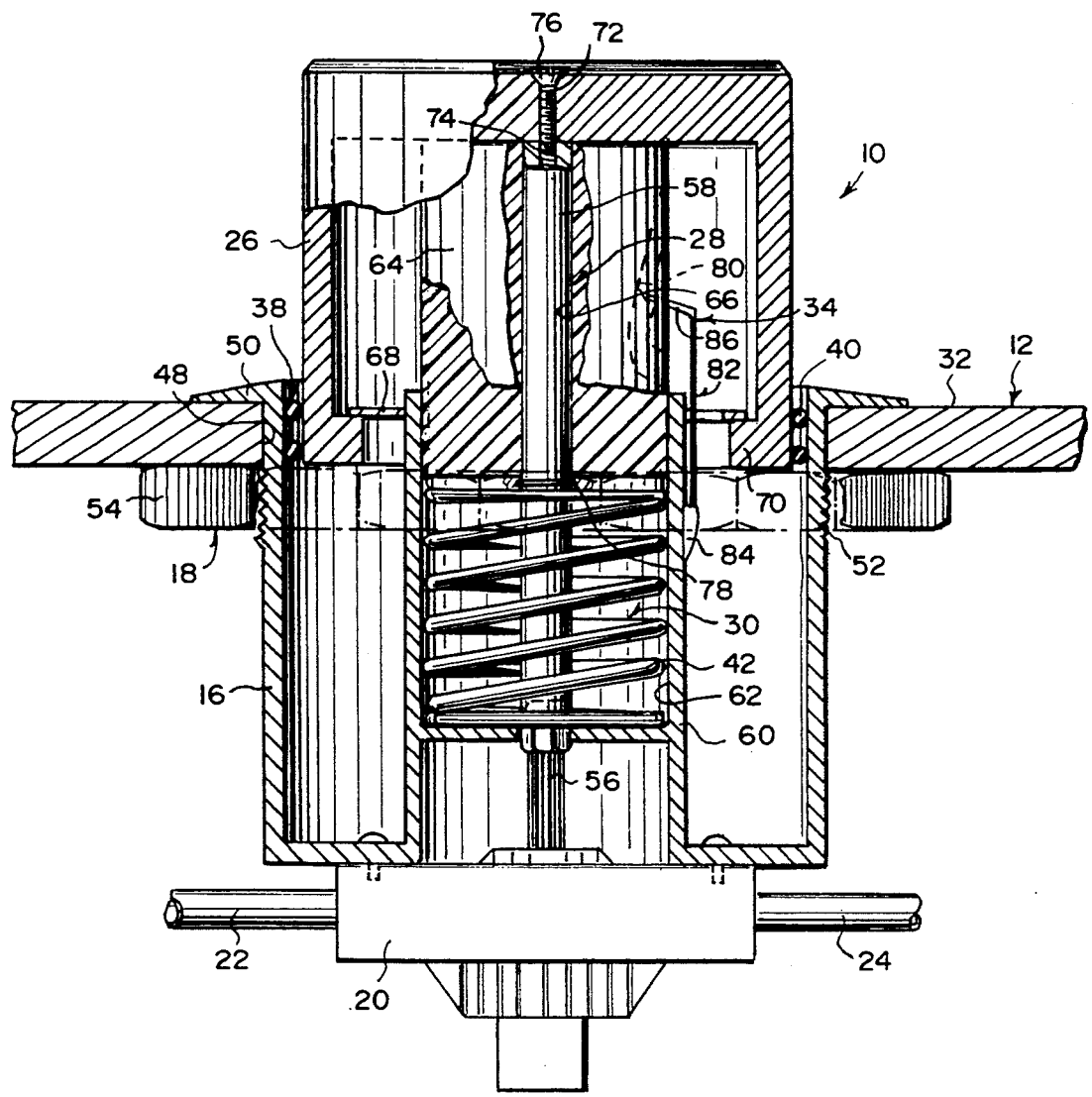
FIG. 6 is an enlarged cross sectional view of the push control faucet handle showing the internal components in greater detail.

The mounting structure 18 in FIG. 6, consists of the housing 16 having a flange 50 about a top edge and external threads 52 thereabout. A large nut 54 engages with the external threads 52 on the housing 16 below the flange 50, so that the flange 50 and the nut 54 will hold the housing 16 in an aperture 48 on the sink 12.

The adjustably coupling apparatus 28 includes the water control valve 20 having a splined stem 56 extending upwardly. A splined hollow shaft 58 extends downwardly from the knob 26 to engage with and slide upon the splined stem 56.

The housing 12 has an inner frame 60 forming a compartment 62 for the helical compression spring 42. A bushing 64 having a central bore 66 therethrough is carried in the knob 26, so that the splined hollow shaft 58 can extend through the central bore 66. The bushing 64 can enter the inner frame 60 and sit upon the helical compression spring 42.

A stop member 68 is affixed to the inner frame 60 of the housing 16. An inwardly facing collar 70 is on the knob 26 below the stop member 68. The stop member 68 will prevent the knob 26 from being forced out of the housing 16 due to pressure from the helical compression spring 42.

The knob 26 has a central threaded hole 72 therein. The splined hollow shaft 58 has a top central threaded hole 74 therein. A mounting screw 76 engages with the central threaded hole 72 in the knob 26 and the central threaded hole 74 in the splined hollow shaft 58 to hold the knob 26 thereto. A retainer washer 78 is mounted to the splined hollow shaft 58 above the helical compression spring 42 and below the bushing 64, to prevent the bushing 64 from sliding down the splined hollow shaft 58.

The retaining mechanism 34 includes the bushing 64 having a lock valley 80 formed in one side thereof. A lock spring pin 82 is mounted at a first end 84 to one side of the inner frame 60, with a second end 86 extending upwardly to engage with the lock valley 80. When the knob 26 is pressed down, the lock spring pin 82 will follow a pre-determined path within the lock valley 80, to reach a locked point in the lowered position. When the knob 26 is pressed again the lock spring pin 82 will become released from the locked point to allow the knob 26 to travel back to the raised position.

LIST OF REFERENCE NUMBERS 10 push control faucet handle
12 sink
14 spout
16 housing
18 mounting structure
20 water control valve
22 first pipe line on 20
24 second pipe line on 20
26 knob
28 adjustably coupling apparatus
30 biasing device
32 top surface of 12
34 retaining mechanism
36 young child
38 sealing member
40 rubber O-ring of 38
42 helical compression spring for 30
44 escutcheon plate
46 opening in 44
48 aperture in 12
50 flange on 16
52 external threads on 16
54 large nut
56 splined stem on 20
58 splined hollow shaft
60 inner frame
62 compartment in 60
64 bushing
66 central bore in 64
68 stop member on 60
70 inwardly facing collar on 26
72 central threaded hole in 26
74 top central threaded hole in 58
76 mounting screw
78 retainer washer
80 lock valley in 64
82 lock spring pin
84 first end of 82
86 second end of 82

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A push control faucet handle for a sink having a spout which comprises:
   a) a housing;
   b) means for mounting said housing to the sink;
   c) a water control valve connected to bottom of said housing, said water control valve having a first pipe line connected to a water supply and a second pipe line connected to the spout in the sink;
   d) a knob which rides within said housing;
   e) means for adjustably coupling said knob to said water control valve;
   f) means for biasing said knob to a raised position above a top surface of the sink, so that said knob can be manually rotated to open and close said water control valve to control the flow of water from the water supply to the spout in the sink;
   g) a stop member affixed to an inner frame in said housing, and an inwardly facing collar on said knob below said stop member, so that said stop member will prevent said knob from being forced out of said housing due to pressure from said biasing means; and
   h) means for retaining said knob in a lowered position flush with the top surface of the sink, when said knob is pressed down into said housing and for releasing said knob so it will return to the raised position when said knob is pressed again, wherein said retaining means includes:
   1) said bushing having a lock valley formed in one side thereof; and
   2) a lock spring pin mounted at a first end to a side of said inner frame with a second end extending upwardly to engage with said lock valley, so that when said knob is pressed down, said lock spring pin will follow a pre-determined path within said lock valley to reach a locked point in the lowered position and when said knob is pressed again said lock spring pin will become released from the locked point, to allow said knob to travel back to the raised position, whereby when said knob is in the lowered position a young child will have difficulty in reaching and operating said knob.

2. A push control faucet handle as recited in claim 1, further including means for sealing a space between said housing and said knob, so as to prevent water leakage into said housing from the top surface of the sink.

3. A push control faucet handle as recited in claim 2, wherein said sealing means is at least one rubber O-ring.

4. A push control faucet handle as recited in claim 3, wherein said biasing means is a helical compression spring.

5. A push control faucet handle as recited in claim 4, wherein said mounting means is an escutcheon plate having an opening therethrough in which said housing is affixed therein, whereby said housing will extend through an aperture in the sink.

6. A push control faucet handle as recited in claim 4, wherein said mounting means includes:
   a) said housing having a flange about a top edge and eternal threads thereabout; and
   b) a large nut to engage with said external threads on said housing below said flange, so that said flange and said nut will hold said housing in an aperture on the sink.

7. A push control faucet handle as recited in claim 6, wherein said adjustably coupling means includes:
   a) said water control valve having a splined stem extending upwardly; and
   b) a splined hollow shaft extending downwardly from said knob to engage with and slide upon said splined stem.

8. A push control faucet handle as recited in claim 7, further including:
   a) said inner frame forming a compartment for said helical compression spring;
   b) a bushing having a central bore therethrough carried in said knob, so that said splined hollow shaft can extend through said central bore and said bushing can enter said inner frame and sit upon said helical compression spring.

9. A push control faucet handle as recited in claim 8, further including:
   a) said knob having a central threaded hole therein;
   b) said splined hollow shaft having a top central threaded hole therein;
   c) a mounting screw to engage with said central threaded hole in said knob and said central threaded hole in said splined hollow shaft to hold said knob thereto; and
   d) a retainer washer mounted to said splined hollow shaft above said helical compression spring and below said bushing, to prevent said bushing from sliding down said splined hollow shaft.

* * * * *